United States Patent
Burnett, III et al.

(10) Patent No.: US 10,412,363 B1
(45) Date of Patent: Sep. 10, 2019

(54) LIGHT-FIELD DISPLAY WITH MICRO-LENS ALIGNMENT ADAPTED COLOR AND BRIGHTNESS

(71) Applicant: FoVI 3D, Austin, TX (US)

(72) Inventors: Thomas Lawrence Burnett, III, Austin, TX (US); Kendall James, Austin, TX (US); Nick Jameson, Austin, TX (US); Ronald Larcom, Austin, TX (US)

(73) Assignee: 3D Patents, LLC, Mission Hills, KS (US)

(*) Notice: Subject to any disclaimer, the term of this patent is extended or adjusted under 35 U.S.C. 154(b) by 0 days.

(21) Appl. No.: 16/044,009

(22) Filed: Jul. 24, 2018

Related U.S. Application Data (63) Continuation-in-part of application No. 15/082,575, filed on Mar. 28, 2016, now abandoned.

(60) Provisional application No. 62/138,876, filed on Mar. 26, 2015.

(51) Int. Cl.
| | |
|---|---|
| *G06T 19/20* | (2011.01) |
| *G09G 5/06* | (2006.01) |
| *H04N 13/15* | (2018.01) |
| *H04N 9/04* | (2006.01) |
| *H04N 13/00* | (2018.01) |

(52) U.S. Cl.
CPC ............. *H04N 13/15* (2018.05); *G06T 19/20* (2013.01); *G09G 5/06* (2013.01); *H04N 9/04519* (2018.08); *G03H 2223/00* (2013.01); *G03H 2240/54* (2013.01); *H04N 2013/0077* (2013.01)

(58) Field of Classification Search
CPC ....... G06T 19/00; G06T 15/405; G06T 5/001; G06T 19/20; G09G 5/02; G09G 5/06; G03H 2223/15; G03H 2223/25; G03H 2223/00; G03H 2223/35; G03H 2225/61; G03H 2240/00; G03H 2240/54; H04N 13/15; H04N 9/04519; H04N 2013/0077
See application file for complete search history.

(56) References Cited

U.S. PATENT DOCUMENTS

| | | | | |
|---|---|---|---|---|
| 2010/0149139 A1* | 6/2010 | Kroll | .................. | G02B 26/0875 345/204 |
| 2010/0271678 A1* | 10/2010 | Wilson | ................. | G03H 1/0808 359/9 |
| 2012/0105823 A1* | 5/2012 | Hardegger | ............ | G01S 17/023 356/5.01 |

* cited by examiner

*Primary Examiner* — Ke Xiao
*Assistant Examiner* — Andrew Shin
(74) *Attorney, Agent, or Firm* — Campbell Stephenson LLP (57) ABSTRACT

A light-field display with pixel to micro-lens spatial alignment adapted color or brightness. In one embodiment, a first pixel is read from memory. A map is accessed to read a first index that is mapped to a first position of a first emitter in an array of emitters. A first correction data mapped to the first index is read. The first pixel is adjusted using the first correction data. The first emitter emits light based on the adjusted first pixel.

12 Claims, 9 Drawing Sheets

LIGHT-FIELD DISPLAY WITH MICRO-LENS ALIGNMENT ADAPTED COLOR AND BRIGHTNESS

CROSS-REFERENCE TO RELATED APPLICATIONS

The present patent application is a continuation of U.S. patent application Ser. No. 15/082,575, filed on Mar. 28, 2016, entitled "Light-Field Display with Depth Adapted Color and Brightness"; which claims the domestic benefit under Title 35 of the United States Code § 119(e) of U.S. Provisional Patent Application Ser. No. 62/138,876, entitled "Light-field Display Depth Adapted Color and Brightness," filed Mar. 26, 2015. All are hereby incorporated by reference in its entirety and for all purposes as if completely and fully set forth herein.

BACKGROUND

The physical world around us is three-dimensional (3D), yet traditional display devices can show only two-dimensional (2D) flat images that lack depth (i.e., the third dimension) information. This fundamental restriction in 2D displays greatly limits our ability to perceive and to understand the complexity of real-world objects.

Nearly 50% of the capability of the human brain is devoted to processing visual information. Flat images from displays do not harness the brain's power effectively. With rapid advances in the electronics, optics, etc., true 3D display technologies are making their way into the marketplace.

SUMMARY

A 3D light-field display projection (hereinafter 3D projection or 3D image) can be reconstructed by projecting light rays through micro-lenses (hereinafter lenses) or by a reflection/transmission photopolymer hologram. The present invention will be described with reference to reconstruction by projection of light rays through a lens, it being understood the present invention should not be limited thereto. Some visual artifacts of a 3D image in such a system are luminance and chromatic aberration that is dependent upon the source ray's radial distance from the accompanying lens center. As such, the 3D image loses brightness and colors fade when viewed from more extreme angles. This invention relates generally to the correction of color or brightness of a 3D image. In one embodiment, the color or brightness of a 3D image can be corrected as a function of a source emitter's radial distance from the associated lens' center. In one embodiment, the correction is implemented on a pixel-by-pixel basis. For example, a spatially addressable color correction matrix index map in memory is accessed to read a first index i that is used to access a first color correction matrix (CCM) from a list of CCMs in memory. The first pixel is adjusted using the first CCM. Subsequent pixels of a radiance image are processed in like manner, each with a potentially different corresponding CCM. Thereafter the radiance image is displayed using the adjusted pixels.

BRIEF DESCRIPTION OF THE DRAWINGS

The present invention may be better understood in its numerous objects, features, and advantages made apparent to those skilled in the art by referencing the accompanying drawings.

FIG. 5b shows a top view of a lens and emitters shown in FIG. 5a.

The use of the same reference symbols in different drawings indicates similar or identical items.

DETAILED DESCRIPTION

Figure 1:
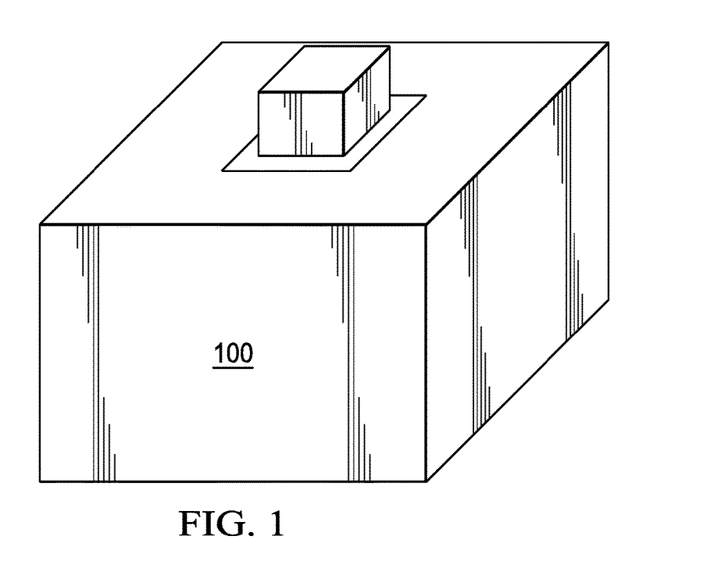
FIG. 1 illustrates a light-field display system that projects a 3D image of an example cube in accordance with one embodiment of the present invention.

FIG. 1 illustrates an example light-field display system 100 that projects 3D images, such as the example cube. Different features of the example cube can be seen by a viewer as the viewer changes his viewing angle while looking down into system 100. Importantly the 3D image (e.g., cube) projected by system 100 is visible to the unaided eye (i.e., without special glasses or head tracking devices) and allows for perspective correct visualization within system 100's projection volume. Binocular disparity, occlusion, specular highlights and gradient shading, and other expected depth cues of the cube are generally correct from the viewer's perspective.

System 100 is essentially a plenoptic projector. Plenoptic cameras (such as those developed by Lytro and RayTrix, not shown) can be used to capture 3D scenes in the form of 2D radiance images, where pixels of a radiance image captured by the camera describe rays of light as imaged through micro-lenses. Mathematically, the radiance image represents the light-field plenoptic function L, which is typically parameterized for computer vision in terms of a 6D function:

$$L = P(\Theta, \Box, \lambda, Vx, Vy, Vz)$$

Figure 3:
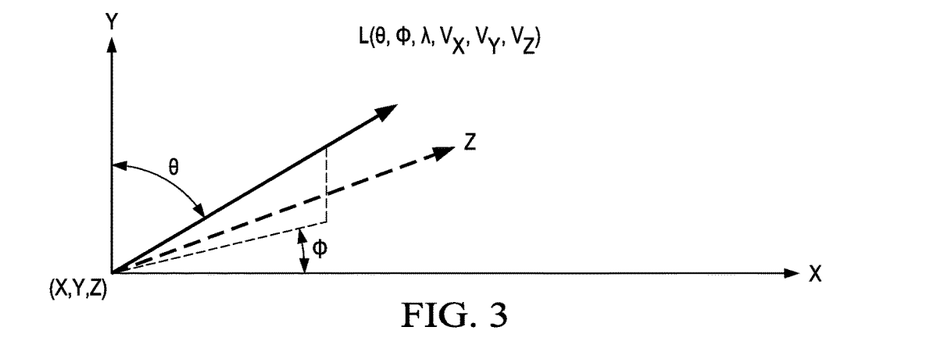
FIG. 3 graphically illustrates the light-field plenoptic function L.

(Vx,Vy,Vz) defines a point in space
($\Theta,\Box$) defines the orientation or direction of a ray
($\lambda$) defines the wavelength FIG. 3 illustrates the light-field plenoptic function L and its variables. In essence, pixels of the radiance image represent the position, direction and intensity of rays of light as see through an array of micro-lenses.

Figure 2A:
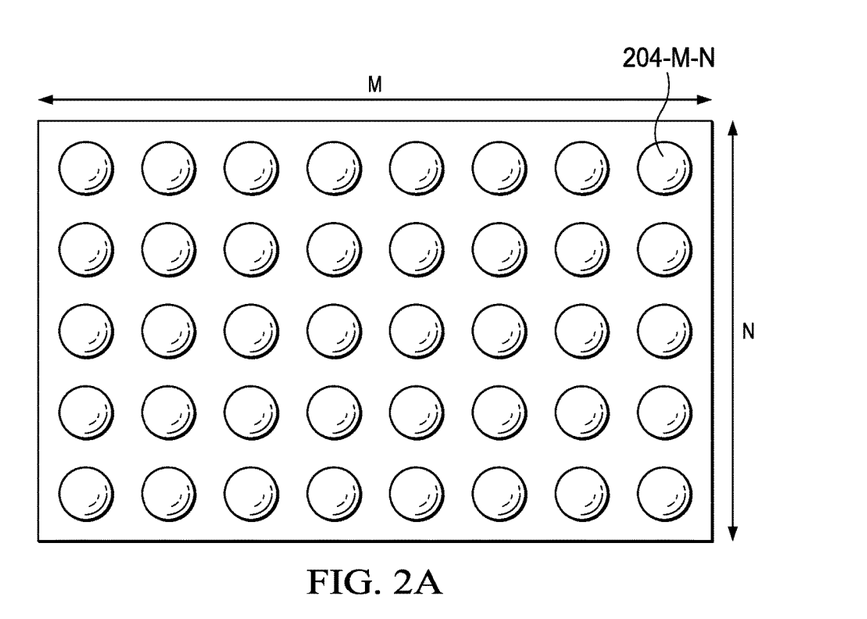
FIGS. 2a and 2b show a top view and a side view of an array of spatial light modulators.
Figure 2B:
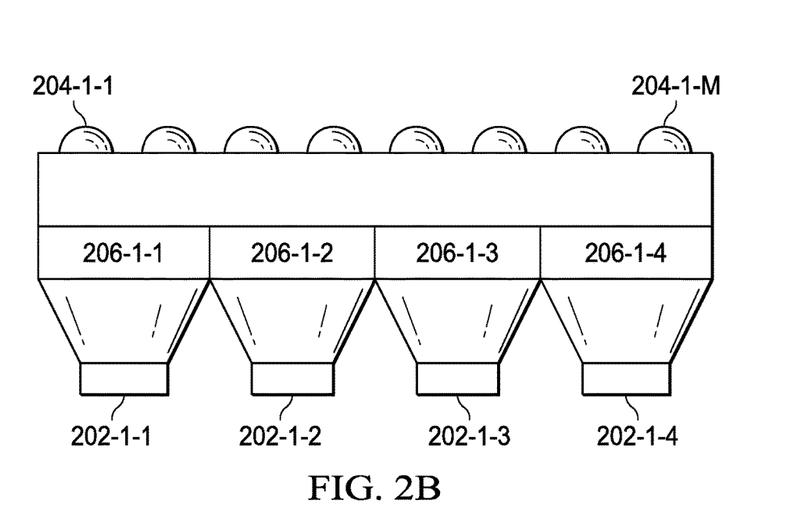

With continuing reference to FIG. 1, FIGS. 2a, 2b and 4 illustrate several components of an example of system 100. FIGS. 2a and 2b show a top view and a side view of a 4×5 array of 2D spatial light modulators (SLMs) 202 such as LCDs LCoSs, OLeDs, etc., optically coupled to an M×N array of micro-lenses 204 via optical guides 206. Only the first row of SLMs 202 and guides 206 are shown in FIG. 2b. M can be substantially greater than 4, and N can be substantially greater than 5. The will lenses 204 relay an image plane, angular distributing the light rays to reconstruct the light-field. System 100 reconstructs a 3D image by projecting a synthetically rendered radiance image through the array of micro-lenses 204.

Figure 4:
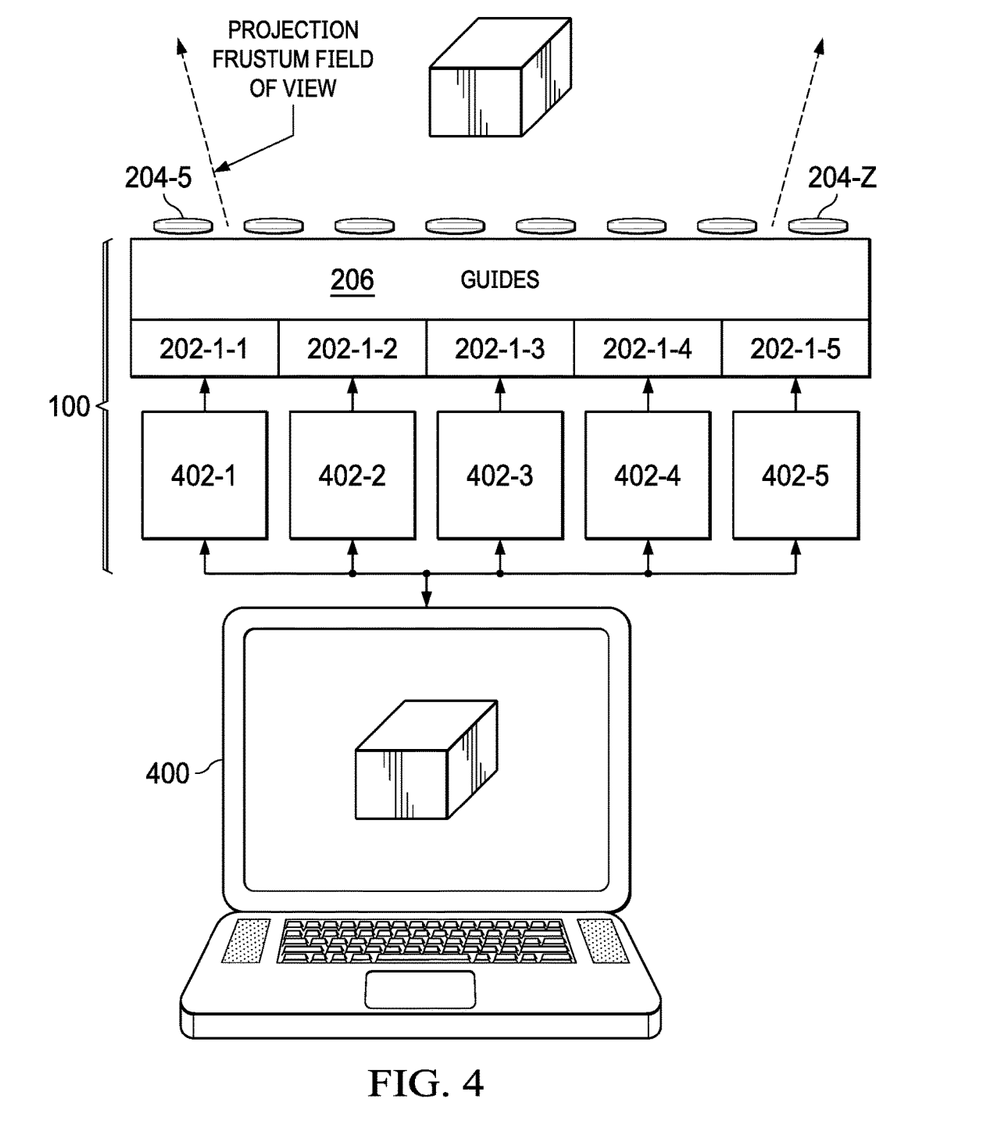
FIG. 4 illustrates additional components of the system shown in FIG. 1

FIG. 4 illustrates the SLMs 202, guides 206 lenses 204 of FIG. 2b. FIG. 4 also shows a host computer 400 in data communication with graphical processing units (GPUs) 402. Host computer 400 passes a 3D model of an object, such as the example cube, and other data to system GPUs 402 for processing, the results of which are provided as data input to SLMs 202. Each SLM 202 includes an array of light emitters, and each light emitter includes a red, blue, and green component. Data input from the GPUs 402 control the light emitted from the light emitter components.

SLMs 202 synthetically render the radiance image by generating micro-images based on data provided by GPUs 402. Each micro-image is referred to as a hogel (holographic element). Thus, each hogel consists of a group of pixels from a respective group of light emitters. Hogels displayed by an SLM 202 are projected through respective micro-lenses 204. Therefore, a synthetically rendered radiance image is a 2D array of hogels that are projected through an array of micro-lenses 204, respectively.

Figure 5A:
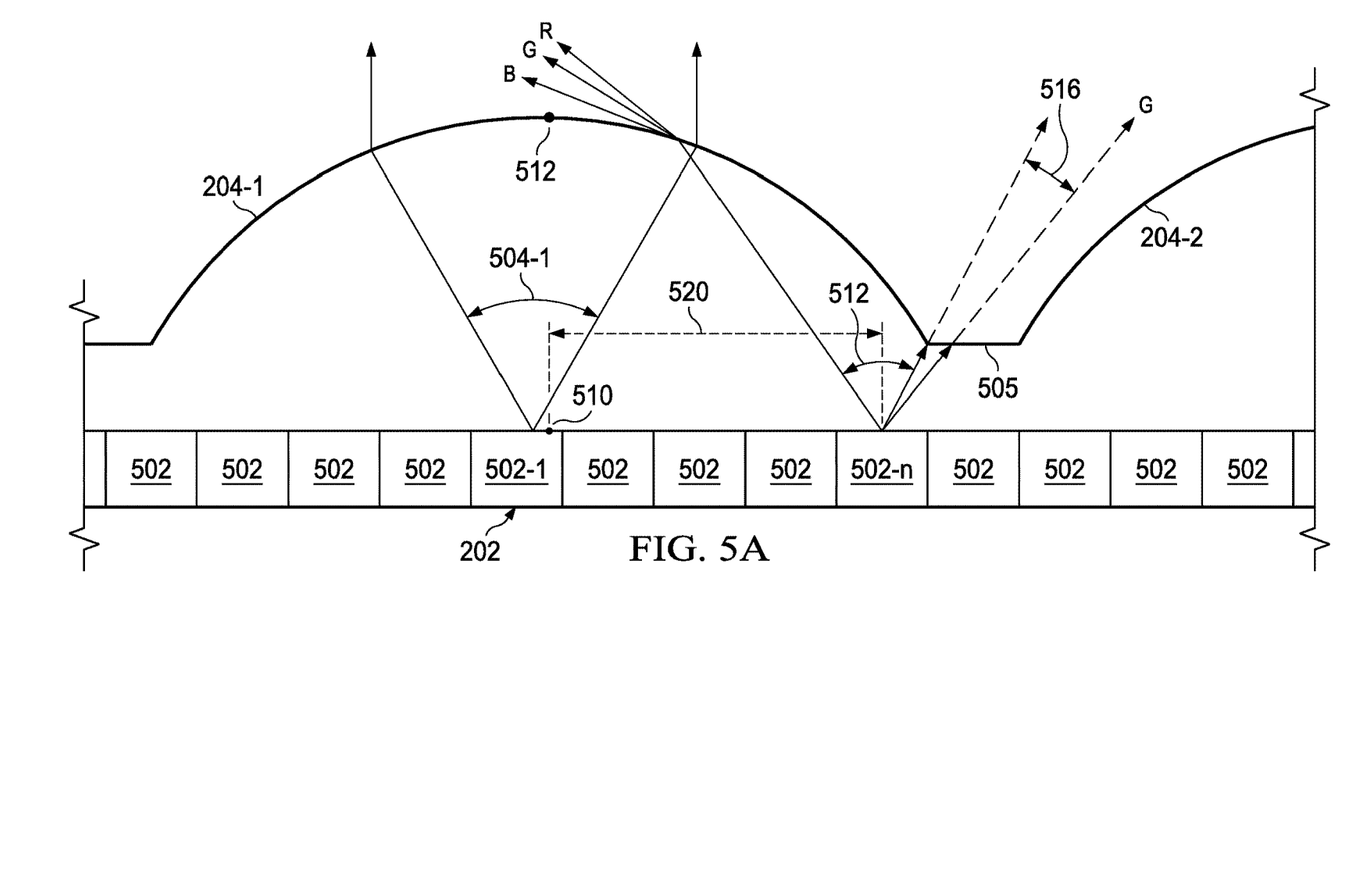
FIG. 5a illustrates a pair of lenses and emitters of an SLM of the system shown in FIG. 1.
Figure 5B:
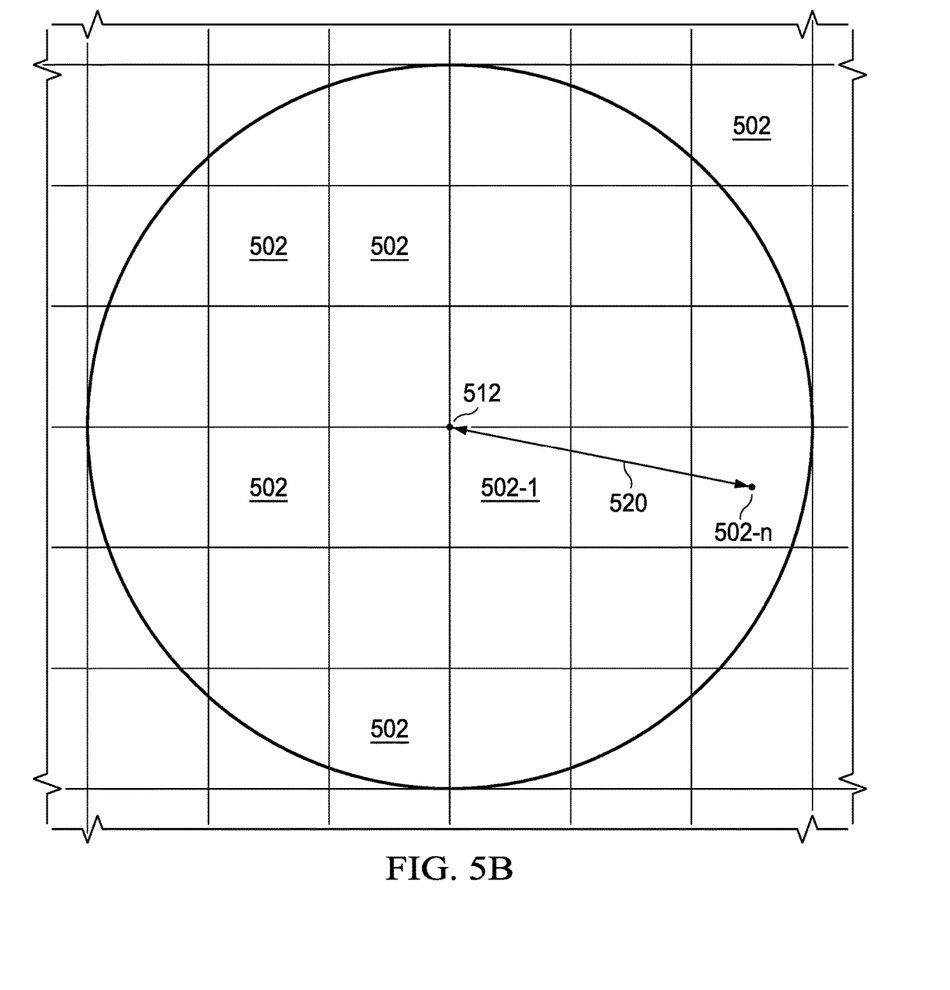

FIG. 5a illustrates a cross-sectional view of light emitters 502 of a SLM 202 and a pair of lenses 204-1 and 204-2. Guides 206 are not shown. A planar portion 505 connects lenses 204-1 and 204-2. Each of the light emitters 502 generates red, green, and blue components. Group 503 of light emitters 502 emit pixel light of a hogel, which is projected by lens 204-1, of the example cube. Emitters 502 beneath planar element 505 do not contribute to the reproduction of a virtual object. FIG. 5b is a top view of light emitters 502 as seen through lens 204-1 shown in FIG. 5a.

With continuing reference to FIG. 5a, lens 204-1 refracts pixel light from emitters 502. Refraction is the bending of light due to a change in its transmission medium. The amount of bending that light experiences is expressed in terms of the angle of refraction (more accurately, by the difference between the angle of refraction and the angle of incidence). The refraction angle is dependent on the frequency of light; Blue light may refract more than red light.

Figure 6:
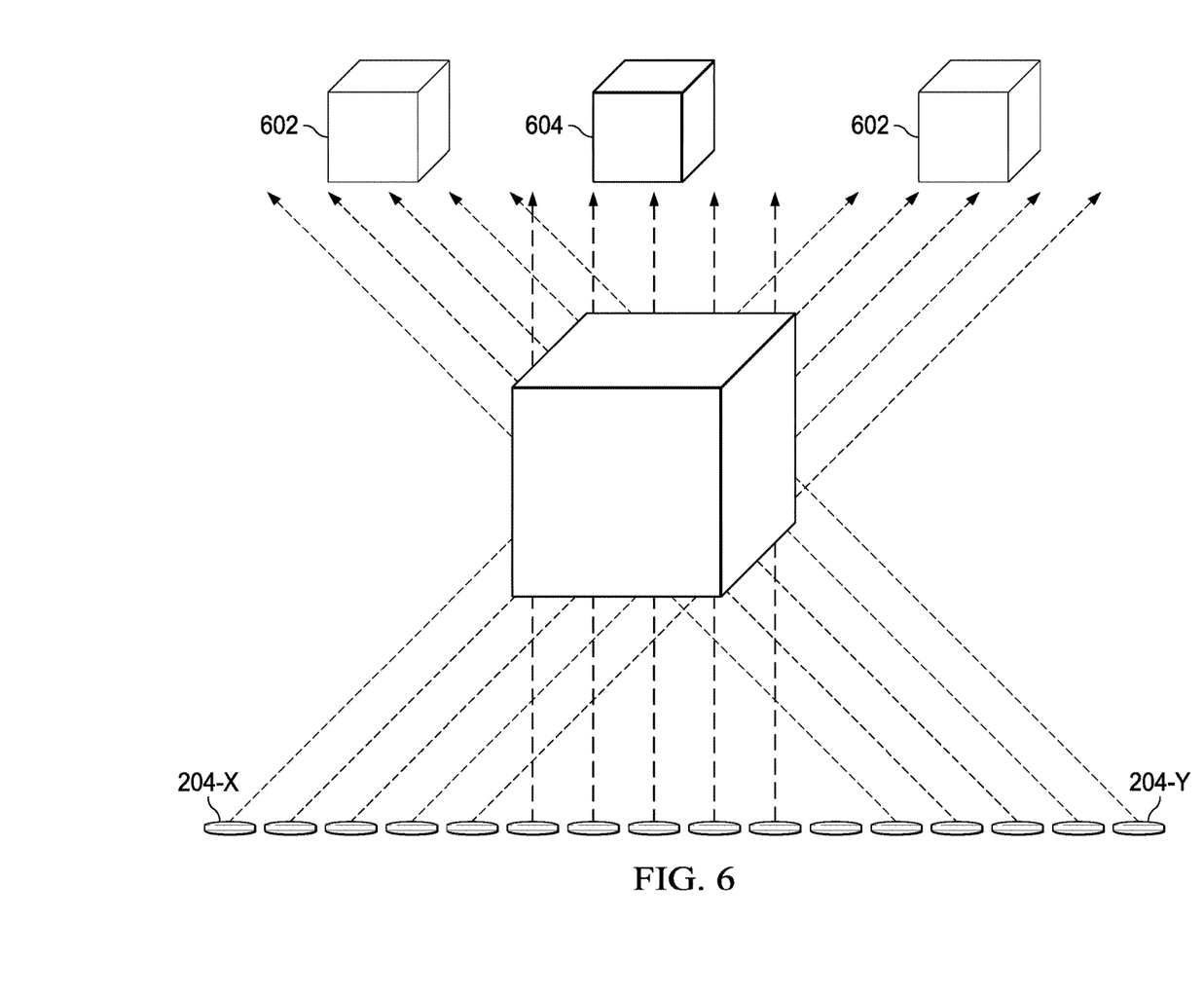
FIG. 6 illustrates decay in color and brightness of a projected image as a function of viewing angle.

Since a synthetically rendered radiance image is a quantized representation of a light-field of a defined spatial and angular resolution, there is a limit to the projected image fidelity. An artifact of the 3D image is that projection resolution, color and perceived brightness fades as light is refracted by the lens at different refraction angles. FIG. 6 illustrates this artifact. FIG. 6 illustrates the decay in brightness as a function of refraction angle by the lenses 204. Although it may be difficult to observe in FIG. 6, the color and projection resolution of the cube degrades as a function of refraction angle such that the color and projection resolution of the cube is reduced when viewed from more extreme angles.

The color, clarity or brightness of a projected image such as the cube can depend on the angle at which the object is seen, which in turn is affected by the position of emitters 502 with respect to the optical center of the lens 204. FIG. 5a illustrates light 504-1 from emitter 502-1 and light 504-n from emitter 502-n. As shown emitter 502-n has a radial distance 520 from center 510. Emitter 502-1 has virtually no radial distance from center 510. It is noted that center 510 aligns with the optical center 512 of lens 204-1 on its optical axis.

All light 504-1 from emitter 502-1, which is positioned essentially at the center 510 of the emitters 502, is symmetrically refracted about the optical center 512 of lens 204-1 as shown. The same cannot be said for emitters 502 that have a greater radial offset from center 510. Further, most of all light from emitters 502 at or near center 510 contribute to the formation of the example cube. The same cannot be said for light from emitters farther removed from center 510. For example a portion 514 of light from emitter 502-n is transmitted by lens 204-1 and contributes to the example cube, while portion 516 received by planar element 505 and is lost as noise.

FIG. 6 shows the effects of these emitter position factors. More particularly, FIG. 6 shows the example cube at different viewing angles. A substantial portion of light that contributes to the image seen at positions 602, emanate from emitters 502 that are farther removed from center 510. In contrast, a substantial portion of light that contributes to the image seed at position 604 emanates from emitters that are closer to center 510. As shown the cube seen from positions 602 appears with less brightness than the cube seen from position 602. Although difficult to see, the color and projection resolution of the image at positions 602 is not as good as the cube when seen at position 604. The degradation of color, projection resolution and brightness of the image at 602 is attributable to the fact that the light seen at these positions is largely composed of light emanating from emitters 502 that more spatially distant from center 510. The present invention corrects these artifacts using spatially addressable color correction matrices (SACCMs). In short, an extra dimension can be added to the plenoptic function, which describes the offset distance of an emitter 502 from center 510, and thus its projected pixel ray of a hogel, relative to hogel's respective lens center.

Typically, host computer system provides the 3D model and other data including the SACCMs and a SACCM index map to the radiance image rendering system. The radiance image rendering system processes the data it receives in accordance with a radiance image rendering program stored in memory (not shown) of the system. The rendered radiance image is displayed as a collective set of hogels by the array of SLMs 202.

Host computer 400 also passes a set of SACCMs, the SACCM index map, and other data (e.g., depth maps, color correction tables, a mathematical definition/model of the array of micro-lenses 204). As noted, a synthetically rendered radiance image is a 2D array of hogels that are projected through an array of micro-lenses 204, respectively. Hogels are rendered by the image rendering system from the point of view of the micro-lenses 204 in model space. The SACCM index map relates to positions of the group of emitter elements that produce the hogel, relative to the optical center of lens that projects the hogel. The center of the hogel's lens 204 coincides with the center of emitters 510 that produce the hogel as noted above.

Hogels are rendered through rasterization or ray-tracing. Every pixel in a hogel represents a unique ray within the hogel's projection frustum. In this case, the pixel in the center of the hogel is projected along the micro-lens' optical axis, while the pixels on the edge of the hogel are projected at the accompanying micro-lens' frustum boundary. The luminance and chromatic aberration of light passed through the lens at different incidence angles can be modelled and/or measured. The transmission efficiency and color degradation effects can therefore be known before projection and used to calculate the SACCMs, which account for the luminance and chromatic aberration of a pixel/ray, and can be used to adjust the hogel pixel/ray intensity values to compensate for color and brightness degradation. The adjusted hogel can result in better color and brightness uniformity within the light-field projection. The SACCM for adjusting a pixel can be provided by an index to a list of SACCMs, a polynomial function or a simple adjustment depending on the extinction properties of the light-field display. The present invention will be described with reference to use of a SACCM, it being understood the present invention should not be limited thereto.

Figure 7:
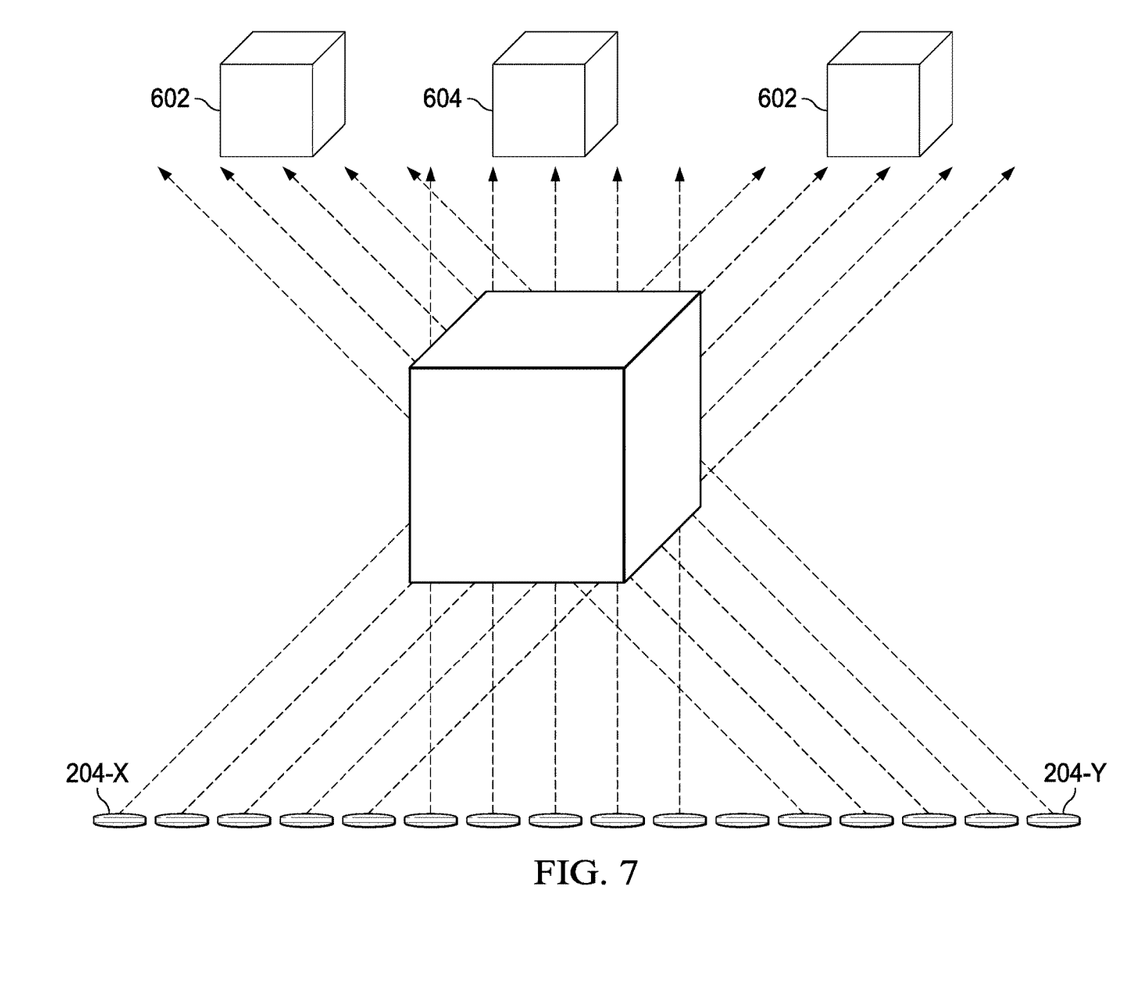
FIG. 7 illustrates the effects of the present invention on the decay in color and brightness of a projected image as a function of viewing angle.

FIG. 7 illustrates the example virtual cube after adjustment of hogel values (i.e., pixels) using SACMMs to compensate for the loss of color and brightness. Although it may be difficult to see from a comparison of the figures, the color, resolution, and perceived brightness of the virtual cube from all viewing perspectives in FIG. 7 is better than the color, resolution, and perceived brightness of the cube as represented in FIG. 6.

Figure 8:
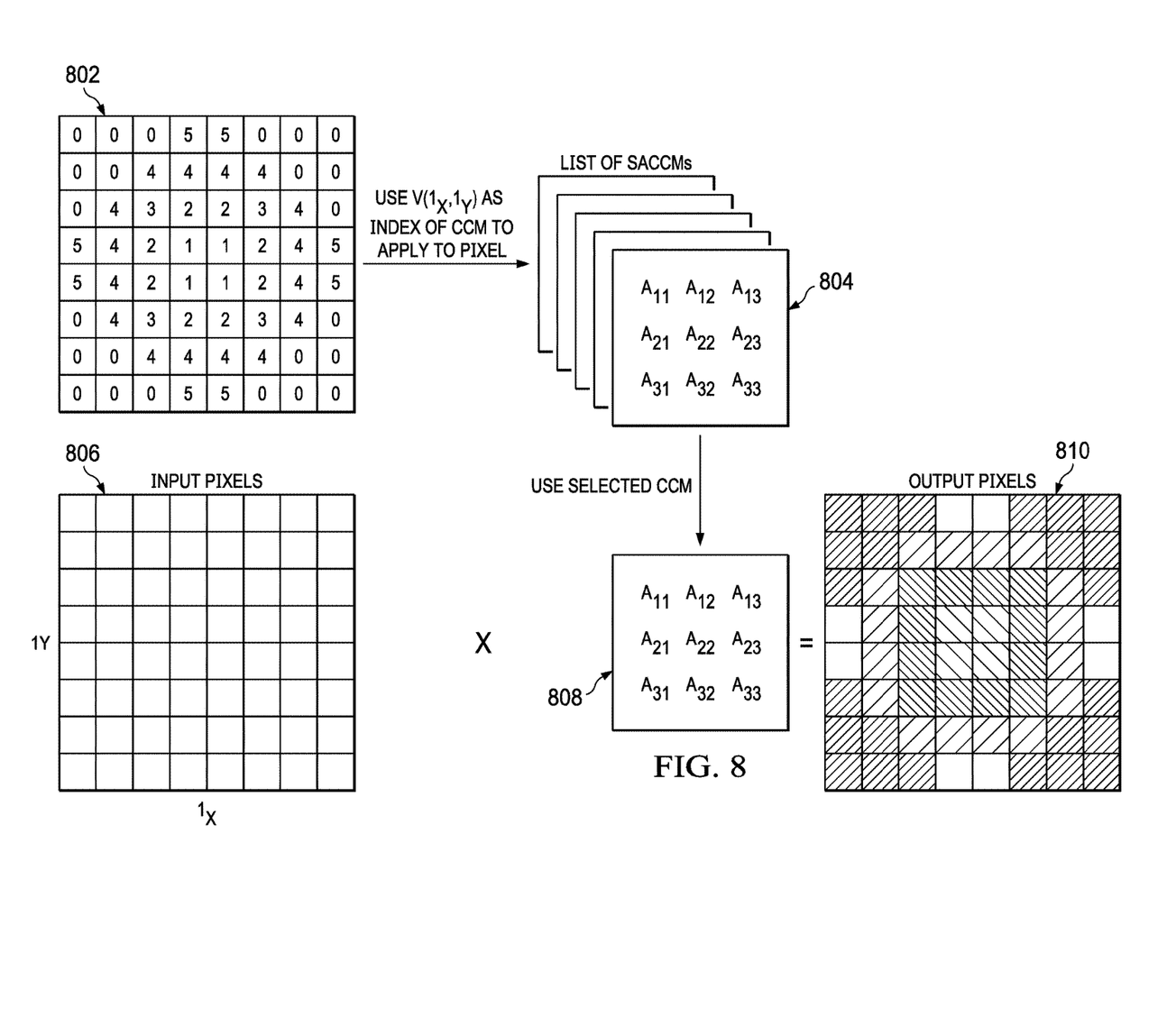
FIG. 8 illustrates an example SACCM index map, and set of SACCMs.
Figure 9:
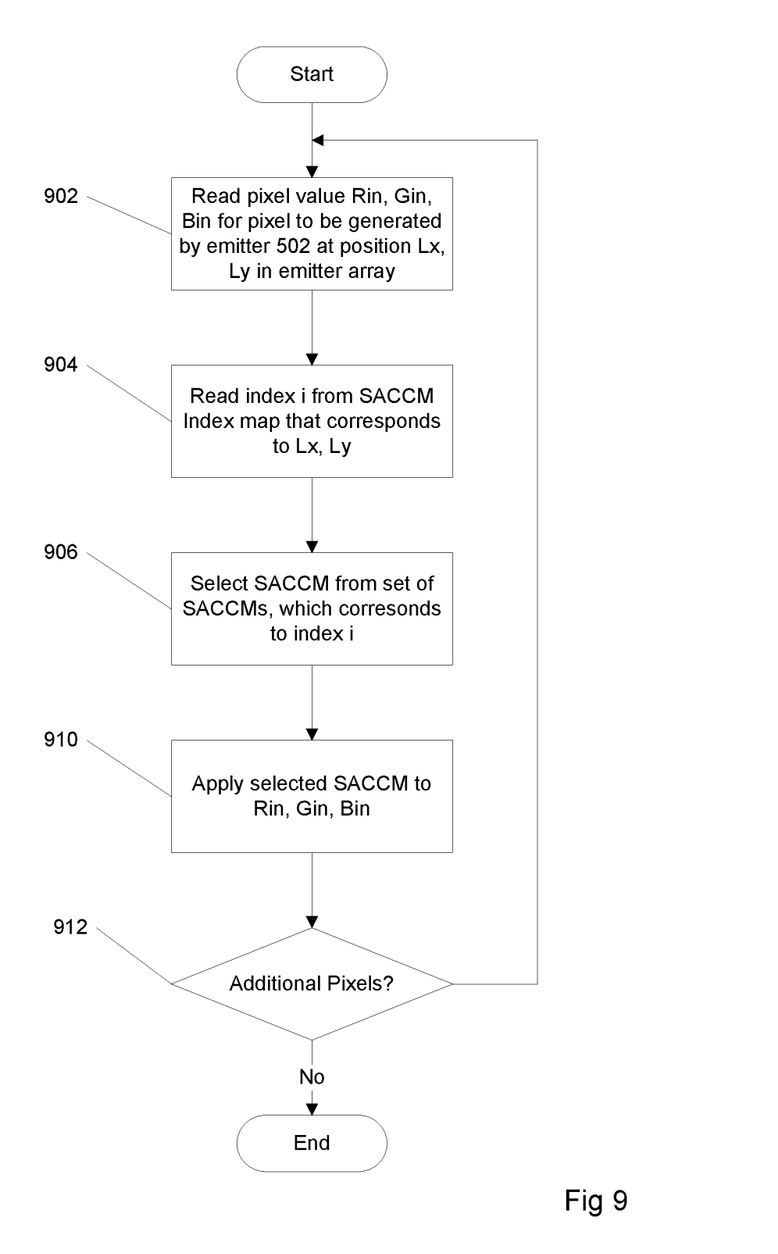
FIG. 9 is a flow chart illustrating one embodiment of a method adjusting pixels in accordance with one embodiment of the present invention.

With reference to FIG. 8, FIG. 9 illustrates an example process for adjusting pixels in accordance with one embodiment of the present invention. The process of FIG. 9 is implemented using a SACCM index map 802, and a set of SACCMs 804 shown in FIG. 8, which in turn are based on a micro-lens system definition provided by host computer system 400. SACCM index map 802 contains 6 index values designated 0 through 5. Each of these index values corresponds to a respective SACCM in the set 804. Accordingly, there are 6 SACCMs in set 804 in the illustrated example.

The process begins in step 902 by reading a pixel of an array of pixels 806 that represent a hogel of a radiance image (e.g., the example cube) stored in memory. Each pixel in the array 806 is associated with a respective emitter 502, which in turn is positioned at coordinates Lx, Ly in the array of emitters that will project the hogel. Coordinates Lx, Ly describe the horizontal and vertical offsets of emitters, and thus the pixels of the hogel, from center 510 described above. The pixel selected in step 902 has a specific coordinates Lx, Ly. In step 904 an index i corresponding to the specific coordinates Lx, Ly is read from the SACCM index map 802 stored in memory. In step 906, the SACCM corresponding to index i is selected from the set 804 stored in memory. In step 910, the selected SACCM 808 is applied to the Rin, Gin, and Bin values of the pixel read in step 902 using matrix multiplication, to generate an adjusted pixel. The pixel read from memory in step 902 is replaced with the adjusted pixel. This process repeats for additional pixels in the hogel. FIG. 8 shows adjusted pixels. Once all pixels of the radiance image are adjusted, the radiance image is displayed by the SLMs 202.

The SACCMs can be created beforehand by measuring the extinction properties for all perspective views within the light-field visualization frustum of system 100, to the extent of the view-volume and at a sufficient sampling to characterize and account for extinction. Construction of the SACCMs involves capturing the actual display performance at a range of projection orientations and depths using a variety of color targets. These ray attributes are quantized into a list of spatially addressable color corrections matrices.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
reading a first pixel from memory;
accessing a map to read a first index that is mapped to a first position of a first emitter in an array of emitters;
accessing first correction data mapped to the first index;
adjusting the first pixel using the first correction data;
the first emitter emitting light based on the adjusted first pixel;
reading second pixel from memory;
accessing the map to read a second index that is mapped to a second position of a second emitter in the array of emitters;
accessing second correction data mapped to the second index;
adjusting the second pixel using the second correction data;
the second emitter emitting light based on the adjusted second pixel while the first emitter emits light based on the adjusted first pixel;
a lens receiving a hogel, wherein the hogel comprises the light from the first and second emitters;
wherein the first correction data relates to color correction needed to account for transmission efficiency and refraction differences of the first pixel and the lens.

2. The method of claim 1 wherein the lens comprises an optical center point and an optical axis, wherein the array of emitters comprises a center point, and wherein the center point of the array of emitters and the optical center point are on the optical axis of the lens.

3. The method of claim 2 wherein each index of the map is calculated based on a distance between the center point of the array and a position of a respective emitter in the array of emitters.

4. The method of claim 1 further comprising:
reading third pixel from memory;
accessing the map to read the second index that is mapped to a third position of a third emitter in the array of emitters;
accessing second correction data mapped to the second index;
adjusting the third pixel using the second correction data;
the third emitter emitting light based on the adjusted third pixel while the second emitter emits light based on the adjusted second pixel.

5. A non-transitory computer readable memory (CRM) storing instructions that when executed implement a method, the method comprising:
reading a first pixel from memory;
accessing a map to read a first index that is mapped to a first position of a first emitter in an array of emitters;
accessing first correction data mapped to the first index;
adjusting the first pixel using the first correction data;
reading a second pixel from memory;
accessing the map to read a second index that is mapped to a second position of a second emitter in the array of emitters: accessing second correction data mapped to the second index;
adjusting the second pixel using the second correction data;
wherein the first pixel and the second pixel relate to a hogel to be projected by a lens;
wherein the lens comprises an optical center point and an optical axis, wherein the array of emitters comprises a center point, and wherein the center point of the array of emitters and the optical center point are on the optical axis of the lens;
wherein each index of the map is calculated based on a distance between the center point of the array and a position of a respective emitter in the array of emitters.

6. The non-transitory CRM of claim 5 wherein the first correction data relates to color correction needed to account for transmission efficiency and refraction differences of the first pixel and the lens.

7. The non-transitory CRM of claim 5 wherein the method further comprises:
reading third pixel from memory;
accessing the map to read the second index that is mapped to a third position of a third emitter in the array of emitters;
accessing second correction data mapped to the second index;
adjusting the third pixel using the second correction data.

8. The non-transitory CRM of claim 7 wherein each of the first, second and third pixels is one of a plurality of pixels of a first two-dimensional array of pixels for the hogel, wherein the pixels of the first two-dimensional array are identified by coordinates within the first two-dimensional array, wherein the second and third pixels are identified by second and third coordinates within the first two-dimensional array, and wherein the second index is mapped to the second and third coordinates.

9. An apparatus comprising:
an array of display devices for displaying an array of hogels of a radiance image;
an array of micro-lenses for receiving the array of hogels, respectively;
program memory storing instructions that when executed implement a method, the method comprising:
reading a first pixel of a hogel from memory;
accessing a map to read a first index that is mapped to a first position of a first emitter in an array of emitters of a display device;
accessing first correction data mapped to the first index;
adjusting the first pixel using the first correction data;
wherein each index of the map is calculated based on a distance between a center point of the array and a position of a respective emitter in the array of emitters.

10. The apparatus of claim 9 wherein the method further comprises:
reading second pixel of the hogel from memory;
accessing the map to read a second index that is mapped to a second position of a second emitter in the array of emitters;
accessing second correction data mapped to the second index;
adjusting the second pixel using the second correction data.

11. The apparatus of claim 9 wherein the first correction data relates to color correction needed to account for transmission efficiency and refraction differences of the first pixel and a lens through which the hogel is projected.

12. The apparatus of claim 11 wherein the lens comprises an optical center point and an optical axis, and wherein the center point of the array of emitters and the optical center point are on the optical axis of the lens.

* * * * *